United States Patent
Ehrenberg et al.

(10) Patent No.: US 7,992,451 B2
(45) Date of Patent: Aug. 9, 2011

(54) MAGNETOINDUCTIVE FLOW METER HAVING AN ELECTROMAGNET UNIT WHICH INCLUDES COMBINED MAGNETIC FLUX-CONCENTRATING MEANS

(75) Inventors: Marco Ehrenberg, Bad Sooden-Allendorf (DE); Hans-Werner Schwiderski, Noerten-Hardenberg (DE)

(73) Assignee: ABB Technology AG, Zurich (CH)

( * ) Notice: Subject to any disclaimer, the term of this patent is extended or adjusted under 35 U.S.C. 154(b) by 193 days.

(21) Appl. No.: 12/509,009

(22) Filed: Jul. 24, 2009

(65) Prior Publication Data
US 2010/0024569 A1   Feb. 4, 2010

(30) Foreign Application Priority Data
Jul. 31, 2008  (DE) .................. 10 2008 035 740

(51) Int. Cl.
  *G01F 1/58* (2006.01)
(52) U.S. Cl. .................................. 73/861.12
(58) Field of Classification Search .............. None
  See application file for complete search history.

(56) References Cited

U.S. PATENT DOCUMENTS
  5,583,299 A      12/1996  Murase
  2005/0279956 A1 * 12/2005  Berger et al. ............. 251/77

FOREIGN PATENT DOCUMENTS

| DE | 698 21 474 T2 | 12/2004 |
| DE | 10 2004 053 065 A1 | 5/2006 |
| DE | 102008035724 A1 * | 2/2010 |
| DE | 102008035739 A1 * | 2/2010 |
| EP | 0 418 033 A1 | 3/1991 |
| EP | 0 770 856 B1 | 9/2003 |
| JP | 4-128613 A | 4/1992 |

OTHER PUBLICATIONS

German Office Action dated Apr. 20, 2009.

* cited by examiner

*Primary Examiner* — Harshad Patel
(74) *Attorney, Agent, or Firm* — Buchanan Ingersoll & Rooney PC

(57) ABSTRACT

A magnetoinductive flow meter has an electromagnet unit which is mounted on an outside periphery of a measuring tube. The electromagnet unit can include magnetic flux-concentrating device and electric coils for generating a magnetic field which is oriented substantially perpendicular to the direction of flow of a measuring medium which flows through the measuring tube. The magnetic flux-concentrating device of the electromagnet unit can include ferrite pole cores each respectively associated with each one of the electric coils. A single magnet yoke composed of an electric sheet material can be connected to each ferrite pole core. The magnet yoke can surround the electric coils jointly in a clip-like manner.

14 Claims, 1 Drawing Sheet

MAGNETOINDUCTIVE FLOW METER HAVING AN ELECTROMAGNET UNIT WHICH INCLUDES COMBINED MAGNETIC FLUX-CONCENTRATING MEANS

RELATED APPLICATION

This application claims priority under 35 U.S.C. §119 to German Patent Application No. 10 2008 035 740.5 filed in Germany on Jul. 31, 2008, the entire content of which is hereby incorporated by reference in its entirety.

FIELD

The present disclosure relates to a magnetoinductive flow meter having an electromagnet unit which is mounted on the outside of a measuring tube, in which the magnetoinductive flow meter can, according to at least one exemplary embodiment, include a magnetic flux-concentrating means and electric coils for generating a magnetic field which is oriented substantially perpendicular to the direction of flow of a measuring medium which flows through the measuring tube.

BACKGROUND INFORMATION

An exemplary field of use of a magnetoinductive flow meter of this type can encompass the measurement of the flow rate of liquids, slurries and pastes which have a specific minimum electrical conductivity, for example. An exemplary type of flow-measuring device according to the subject matter of the disclosure is distinguished by very accurate measurement results, with the measurement not creating any loss in pressure in the pipeline system containing the flow-measuring device. In addition, magnetoinductive flow meters do not have any movable components or components which project into the measurement tube, which components would be subject to wear.

On account of the above-described device properties, magnetoinductive flow meters of this type can be used for product generation in the chemical industry, in the pharmaceutical and chemical industries, in water supply and distribution, in wastewater management, in the food industry and the like.

The physical basis for the measurement method used by a magnetoinductive flow meter is formed by Faraday's law of induction, which states that a voltage is induced in a conductor moving in a magnetic field. When utilizing this law of nature for measurement purposes, the electrically conductive medium flows through a measuring tube in which a magnetic field is produced substantially perpendicular to the direction of flow. The voltage induced in the medium is tapped off by an electrode arrangement. Since the measurement voltage obtained in this way is proportional to the determined flow rate of the flowing medium, the volumetric flow rate of the medium can be determined from this, taking into account the concentration and the mass flow rate.

DE 10 2004 053 065 A1 discloses a magnetoinductive flow meter of the generic type. This magnetoinductive flow meter substantially comprises a metal measuring tube which is incorporated in a pipeline via flanged portions at the ends. Two opposing measuring electrodes are inserted into the wall of the measuring tube in an electrically insulated manner. The measuring electrodes serve to detect a measurement voltage. An electromagnet unit, which is likewise arranged on the outside of the measuring tube, produces a magnetic field which is oriented substantially perpendicular to the direction of flow of the conductive measuring medium to be measured. The metal measuring tube has an insulating lining, which also extends over the flanged portions, for the purpose of electrical insulation.

EP 0 770 856 B1 discloses the structural design of an electromagnet unit of a magnetoinductive flow meter which is of interest within the scope of the present disclosure. This electromagnet unit has two electric coils which are positioned opposite one another on the measuring tube coaxially along the longitudinal axis. The coil arrangement produces the magnetic field with the desired orientation. In order to intensify the magnetic field oriented in this way, magnetic flux-concentrating means are used which interact with the inner pole cores of the electric coils, which are composed of a conventional coil former around which coil wire is wound. In the direction of the measuring tube, the end of the pole core is connected to a ferromagnetic plate which comes to rest on the measuring tube. The opposite end of the pole core is surrounded by a pot-like magnet yoke which, in the edge region, is mounted on iron rings which surround the measuring tube to close the magnetic circuit with the opposite electric coil.

The electromagnet unit formed in this way is surrounded by a separate non-magnetic housing which can be composed of stainless steel, for example.

One disadvantage of this conventional electromagnet unit has proven to be the large number of individual components of the magnetic flux-concentrating means which have to be fitted to one another. Since most of the constituent parts of the magnetic flux-concentrating means, such as the multipartite magnet yoke, are in the form of stamped-and-bent parts, it is necessary to manufacture these components in a highly complex manner in a plurality of production steps.

SUMMARY

An exemplary embodiment provides a magnetoinductive flow meter comprising an electromagnet unit configured to be mounted on an outside periphery of a measuring tube. The exemplary electromagnet unit includes magnetic flux-concentrating means, and electric coils. The electric coils are configured to generate a magnetic field which is oriented substantially perpendicular to a direction of flow of a measuring medium which flows through the measuring tube. The magnetic flux-concentrating means include ferrite pole cores each respectively associated with one of the electric coils. The exemplary electromagnet unit comprises a single magnet yoke composed of an electric sheet material connected to each one of the ferrite pole cores such that the magnet yoke is configured to surround the electric coils jointly in a clip-like manner.

An exemplary embodiment provides a magnetoinductive flow meter comprising an electromagnet unit configured to be mounted on an outside periphery of a measuring tube. The exemplary electromagnet unit includes electric coils configured to generate a magnetic field which is oriented substantially perpendicular to a direction of flow of a measuring medium which flows through the measuring tube. The exemplary electromagnet unit also includes ferrite pole cores each respectively associated with one of the electric coils. In addition, the electromagnet unit comprises a single magnet yoke composed of an electric sheet material connected to each one of the ferrite pole cores such that the magnet yoke is configured to surround the electric coils jointly.

BRIEF DESCRIPTION OF THE DRAWINGS

Further advantages and refinements of the present disclosure are explained in more detail below with reference to an exemplary embodiment illustrated in the accompanying drawing, in which.

DETAILED DESCRIPTION

Figure 1:
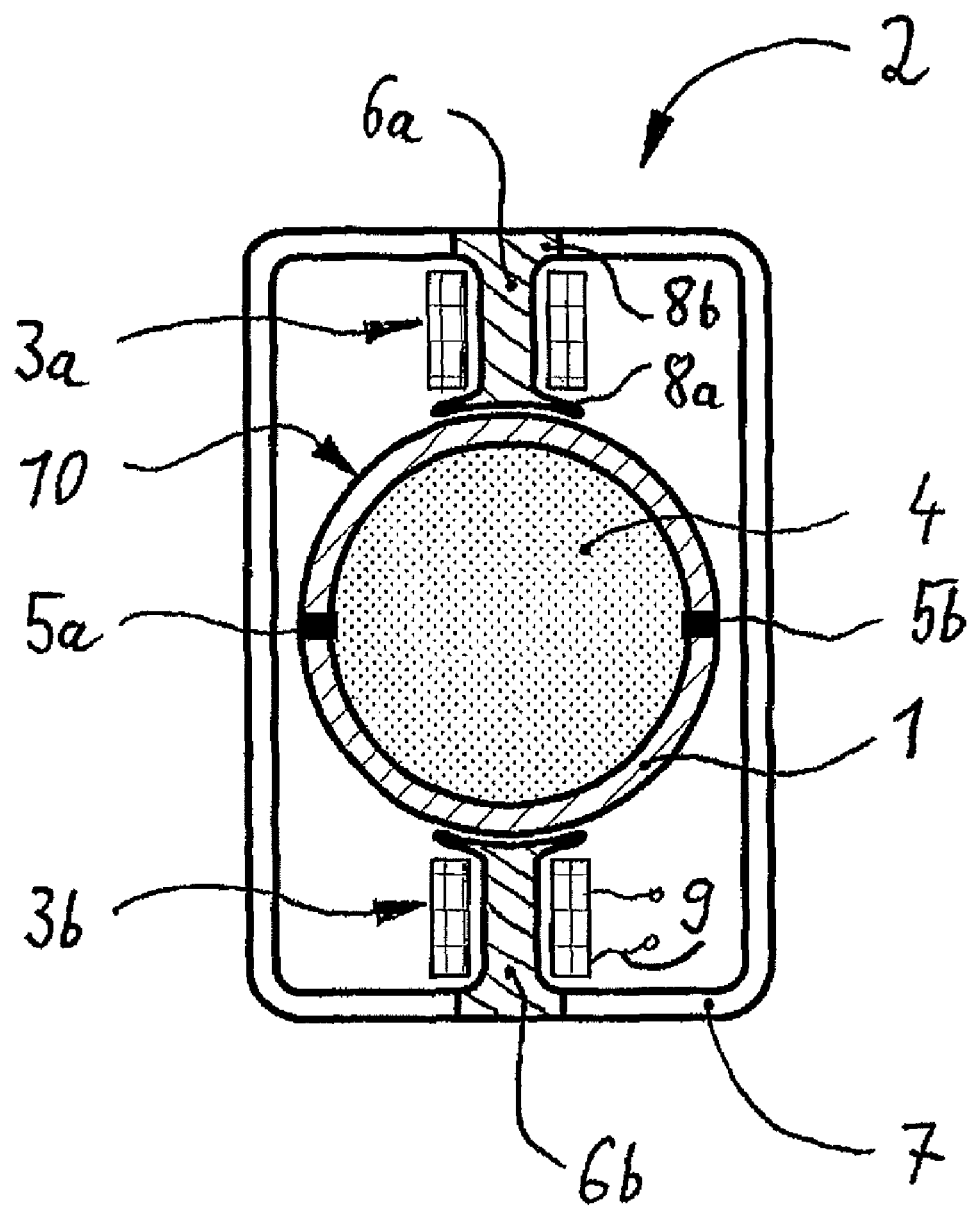
FIG. 1 illustrates a schematic cross section through a magnetoinductive flow meter having a combined electromagnet unit which includes magnetic flux-concentrating means, according to at least one embodiment.

Exemplary embodiments of the present disclosure provide a magnetoinductive flow meter having an electromagnet unit which comprises magnetic flux-concentrating means. In the exemplary magnetoinductive flow meter, the electromagnet unit can be constructed with few individual parts and can be mounted in a simple manner.

An exemplary embodiment provides that the magnetic flux-concentrating means of the electromagnet unit comprise a ferrite pole core which is associated with each electric coil, with a single magnet yoke which is composed of an electric sheet material which is connected to each ferrite pole core being provided, said magnet yoke surrounding the electric coils jointly in a clip-like manner.

An advantageous aspect provided by exemplary embodiments of the disclosure that a ferrite material, which can be primarily shaped and combined with a magnet yoke, which can be composed of an electric sheet material, can be used instead of a known electric laminated core for forming the pole core. By using this combination of a ferrite material with the electric sheet material, a magnet yoke can be produced which jointly surrounds the electric coils, so that only one single component is required to form the outer magnetic circuit, in which such a component is arranged to be connected to the end of the ferrite core in a suitable manner, for example, by pressing. The clip-like magnet yoke which surrounds the two electric coils can thus serve, at the same time, as a support structure for the electric coils which surround the measuring tube.

According to an exemplary embodiment, each ferrite pole core can have a flange molding which extends radially outward at both ends of the corresponding electric coils, respectively. As a result, the ferrite pole core can be arranged in the shape of a coil former, which makes it possible to wind a coil wire directly onto the coil former-like ferrite pole core and thereby dispense with a known plastic coil former.

On the part of the lower flange arrangement, the coil former-like ferrite pole core can be brought into direct contact with the outer surface of the measuring tube. In this respect, known housing components which would otherwise be situated between the ferrite pole core and measuring tube can be dispensed with, and the field strength of the magnetic field is increased by the direct contact with the measuring tube. It is also advantageously beneficial for the lower flange molding of the ferrite pole core to have a curved shape which is matched to or substantially corresponds to the circumference of the cylindrical measuring pipe. This arrangement can help the entire electromagnet unit to be firmly seated on the measuring tube.

The coil former-like ferrite pole core can be produced from a pressed or sintered ferrite materials, for example. As a result, the ferrite pole core according to at least one exemplary embodiment can form a shaped part which can be given the desired functionally integrated form in a manner which is simple in terms of production.

According to an exemplary embodiment, the magnet yoke can form a closed housing for the electric coils and the measuring electrodes. Since the magnet yoke is composed of an electric sheet material, for example, it can be reshaped to match a suitable housing which accommodates the electrical components to be protected. If appropriate, the surrounding housing can be provided with an additional detachable cover for facilitating assembly and servicing.

A housing of this type can contain, for example, two measuring electrodes, which are arranged opposite one another and offset in an orthogonal manner with respect to the electric coils on the circumference of the measuring tube. According to an exemplary embodiment, the measuring electrodes can detect the measurement voltage across the magnetoinductive flow meter and be likewise accommodated in a protected manner by the housing-like magnet yoke. If appropriate, an electronics unit which is connected downstream of the measuring electrodes can also be integrated, in the housing, for example.

An exemplary measuring tube for the magnetoinductive flow meter can be a non-magnetic metal tube which is lined with an electric insulator. A metal measuring tube is particularly pressure- and corrosion-resistant. However, as an alternative to this, it is also feasible to produce the measuring tube from an electrically non-conductive plastic if the boundary conditions with respect to, in particular, pressure and corrosion, for example, would allow this.

According to the exemplary embodiment illustrated in FIG. 1, a magnetoinductive flow meter is provided with an electromagnet unit 2 which is mounted on a measuring tube 1. The electromagnet unit 2 substantially comprises two electric coils 3a and 3b which are oriented opposite one another and coaxially with respect to their longitudinal axes. In the example of FIG. 1, the electric coils 3a and 3b are mounted on the outer periphery of the measuring tube 1, substantially opposed to each other. According to an exemplary embodiment, the application of power to the electric coils 3a and 3b can lead to the production of a magnetic field which is oriented substantially perpendicular to the direction of flow of a measuring medium 4 which flows through the measuring tube 1.

According to an exemplary embodiment, measuring electrodes 5a, 5b which are likewise arranged opposite one another on the measuring tube 1 are provided, by way of example, offset in an orthogonal manner with respect to the two electric coils 3a and 3b. It is to be understood that the aforementioned arrangement of the measuring electrodes 5a, 5b is exemplary, and the present disclosure is not limited thereto. The measuring electrodes 5a, 5b serve to detect a measurement voltage which is produced by the magnetic field, which is produced by the electric coils 3a and 3b, within the measuring medium 4.

According to an exemplary embodiment, the electric coils 3a and 3b can be provided with magnetic flux-concentrating means which each comprise a ferrite pole core 6a and 6b for each electric coil 3a and 3b. In this exemplary embodiment, the ferrite pole cores 6a and 6b comprise a pressed ferrite material and, in this respect, can be constituted by shaped parts.

The shaped pole cores 6a and 6b can be pressed into a corresponding recess in a magnet yoke 7, which, in contrast to the ferrite pole cores 6a and 6b, comprises a ferromagnetic electric sheet material, at the end of the shaped pole cores 6a and 6b which are applied to the measuring tube 1. According to an exemplary embodiment, the magnet yoke 7 can extend, by being bent in a clip-like manner, for example, around the electric coils 3a and 3b and in the process also surrounds the measuring tube 1.

The primarily shaped ferrite pole cores 6a and 6b each have flange moldings 8a and 8b which extend radially outward at both ends of the electric coils 3a and 3b. Therefore, the ferrite pole core 6a or 6b itself forms the shape of a coil former, so that the coil wire 9 can be wound directly onto the ferrite pole core 6a or 6b in order to form the electric coil 3a or 3b.

The lower flange molding 8a of each ferrite pole core 6a or 6b comes into direct contact with the outer surface 10 of the measuring tube 1. In order to adapt the shape, the lower flange molding 8a follows the circumferential curvature of the cylindrical measuring tube 1. This helps securely hold the entire electromagnet unit 2 on the measuring tube 1.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Measuring tube
2 Electromagnet unit
3a, 3b Electric coil
4 Measuring medium
5a, 5b Measuring electrode
6a, 6b Ferrite pole core
7 Magnet yoke
8a, 8b Flange molding
9 Coil wire
10 Outer surface

What is claimed is:

1. A magnetoinductive flow meter comprising an electromagnet unit configured to be mounted on an outside periphery of a measuring tube, the electromagnet unit including:
    magnetic flux-concentrating means; and
    electric coils configured to generate a magnetic field which is oriented substantially perpendicular to a direction of flow of a measuring medium which flows through the measuring tube,
    wherein the magnetic flux-concentrating means include ferrite pole cores each respectively associated with one of the electric coils, and
    wherein the electromagnet unit comprises a single magnet yoke composed of an electric sheet material connected to each one of the ferrite pole cores such that the magnet yoke is configured to surround the electric coils jointly in a clip-like manner.

2. The magnetoinductive flow meter as claimed in claim 1, wherein each ferrite pole core comprises flange mouldings formed on opposite ends of each ferrite pole core, respectively, such that the flange mouldings are configured to extend radially outward at both ends of the electric coils to form a coil former in the electric coil, the coil former being configured to have a coil wire be directly woundable therearound.

3. The magnetoinductive flow meter as claimed in claim 2, wherein the magnet yoke is configured to be pressed over an edge of a respective one of the flange moldings arranged on an outer edge of the corresponding ferrite pole core opposite to an inner edge of the corresponding ferrite pole arranged approximate to the outer periphery of the measuring tube.

4. The magnetoinductive flow meter as claimed in claim 2, wherein the electromagnet unit comprises exactly two electric coils which are arranged coaxially opposite to one another on the measuring tube and have a single, common magnet yoke, such that the magnet yoke surrounds the measuring tube.

5. The magnetoinductive flow meter as claimed in claim 2, wherein a respective first one of the flange moldings of each ferrite pole core comes into direct contact with the outer periphery of the measuring tube.

6. The magnetoinductive flow meter as claimed in claim 5, wherein the first one of the flange moldings of each ferrite pole core has a curved shape which is matched to a circumference of the cylindrical measuring tube.

7. The magnetoinductive flow meter as claimed in claim 2, comprising:
    two measuring electrodes which are arranged opposite to one another and offset in an orthogonal manner with respect to the electric coils on a circumference of the measuring tube, the measuring electrodes being configured to detect a measurement voltage and being surrounded by the magnet yoke,
    wherein the magnet yoke is configured to form a closed housing for the electric coils and the measuring electrodes.

8. The magnetoinductive flow meter as claimed in claim 7, wherein the measuring tube is constituted by either a non-magnetic metal which is lined with an electric insulator or an electrically non-conductive plastic.

9. The magnetoinductive flow meter as claimed in claim 1, wherein the ferrite pole core of the electric coils is composed of a pressed or sintered ferrite material.

10. The magnetoinductive flow meter as claimed in claim 9, wherein the electromagnet unit comprises exactly two electric coils which are arranged coaxially opposite to one another on the measuring tube and have a single, common magnet yoke, such that the magnet yoke surrounds the measuring tube.

11. The magnetoinductive flow meter as claimed in claim 1, comprising:
    two measuring electrodes, which are arranged opposite to one another and offset in an orthogonal manner with respect to the electric coils on a circumference of the measuring tube, the measuring electrodes being configured to detect a measurement voltage and being surrounded by the magnet yoke.

12. The magnetoinductive flow meter as claimed in claim 11, wherein the magnet yoke forms a closed housing for the electric coils and the measuring electrodes.

13. The magnetoinductive flow meter as claimed in claim 1, wherein the measuring tube is constituted by either a non-magnetic metal which is lined with an electric insulator or an electrically non-conductive plastic.

14. A magnetoinductive flow meter comprising an electromagnet unit configured to be mounted on an outside periphery of a measuring tube, the electromagnet unit including:
    electric coils configured to generate a magnetic field which is oriented substantially perpendicular to a direction of flow of a measuring medium which flows through the measuring tube; and
    ferrite pole cores each respectively associated with one of the electric coils,
    wherein the electromagnet unit comprises a single magnet yoke composed of an electric sheet material connected to each one of the ferrite pole cores such that the magnet yoke is configured to surround the electric coils jointly.

* * * * *